(12) United States Patent
Kim et al.

(10) Patent No.: US 9,299,014 B2
(45) Date of Patent: Mar. 29, 2016

(54) MOBILE TERMINAL AND CODE RECOGNITION METHOD THEREOF

(71) Applicant: Samsung Electronics Co., Ltd., Gyeonggi-do (KR)

(72) Inventors: Sang-Ho Kim, Gyeonggi-do (KR); Seong-Taek Hwang, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 14/471,863

(22) Filed: Aug. 28, 2014

(65) Prior Publication Data
US 2015/0063703 A1 Mar. 5, 2015

(30) Foreign Application Priority Data

Aug. 28, 2013 (KR) .......................... 10-2013-0102745

(51) Int. Cl.
| | |
|---|---|
| *G06K 9/46* | (2006.01) |
| *G06K 9/78* | (2006.01) |
| *G06K 9/32* | (2006.01) |
| *G06K 7/10* | (2006.01) |
| *G06K 9/20* | (2006.01) |
| *G06T 3/60* | (2006.01) |

(52) U.S. Cl.
CPC ................ *G06K 9/78* (2013.01); *G06K 7/1092* (2013.01); *G06K 9/2054* (2013.01); *G06K 9/3216* (2013.01); *G06T 3/60* (2013.01)

(58) Field of Classification Search
None
See application file for complete search history.

(56) References Cited

U.S. PATENT DOCUMENTS

| | | | | |
|---|---|---|---|---|
| 5,396,054 | A * | 3/1995 | Krichever et al. | 235/462.1 |
| 5,854,853 | A | 12/1998 | Wang | |
| 7,296,747 | B2 * | 11/2007 | Rohs | 235/462.08 |
| 7,419,097 | B2 * | 9/2008 | Lee et al. | 235/462.11 |
| 7,840,343 | B2 * | 11/2010 | Sakamoto | 701/457 |
| 8,139,894 | B2 * | 3/2012 | Nestares | 382/290 |
| 8,358,321 | B1 * | 1/2013 | Weidner | 345/659 |
| 9,027,837 | B2 * | 5/2015 | Hwang | 235/462.09 |
| 2007/0071320 | A1 | 3/2007 | Yada | |
| 2008/0115064 | A1 * | 5/2008 | Roach et al. | 715/730 |
| 2009/0022429 | A1 | 1/2009 | Longacre, Jr. et al. | |
| 2009/0290751 | A1 | 11/2009 | Ferman et al. | |
| 2011/0081083 | A1 | 4/2011 | Lee et al. | |
| 2013/0193211 | A1 | 8/2013 | Baqai et al. | |

FOREIGN PATENT DOCUMENTS

KR 20120086707 8/2012

OTHER PUBLICATIONS

U. Pal et al., "Multi-Oriented Text Lines Detection and Their Skew Estimation", XP-002735489, Dec. 22, 2002.
European Search Report dated Feb. 13, 2015 issued in counterpart application No. 14182685.9-1901.

* cited by examiner

*Primary Examiner* — Daniel Mariam
(74) *Attorney, Agent, or Firm* — The Farrell Law Firm, P.C.

(57) ABSTRACT

A code recognition method for adjusting a User Interface (UI) rotation angle of a code recognition application depending on the direction of a recognition code or text entered through a camera is provided. The code recognition method includes detecting at least a portion of the recognition code from an image including the recognition code; determining a code rotation angle of the recognition code; and extracting the recognition code or a text from the image including the recognition code based on the code rotation angle of the recognition code.

11 Claims, 14 Drawing Sheets

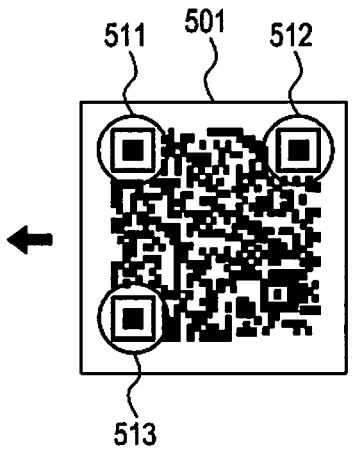
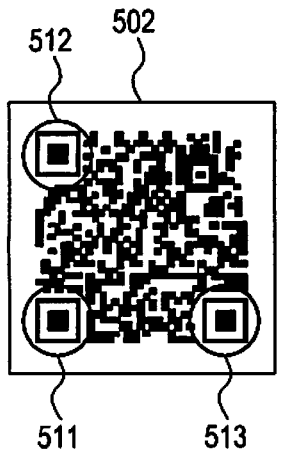
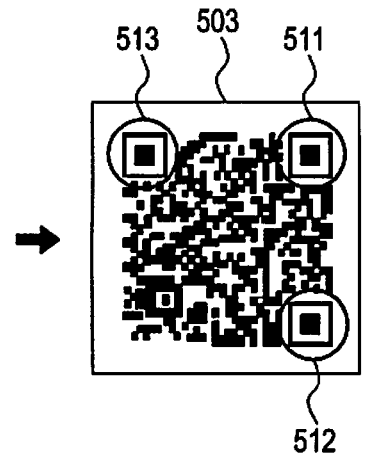
FIG.5B  FIG.5A  FIG.5C
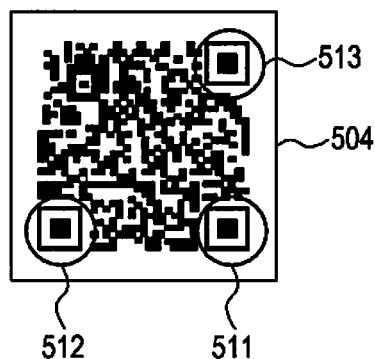
FIG.5D

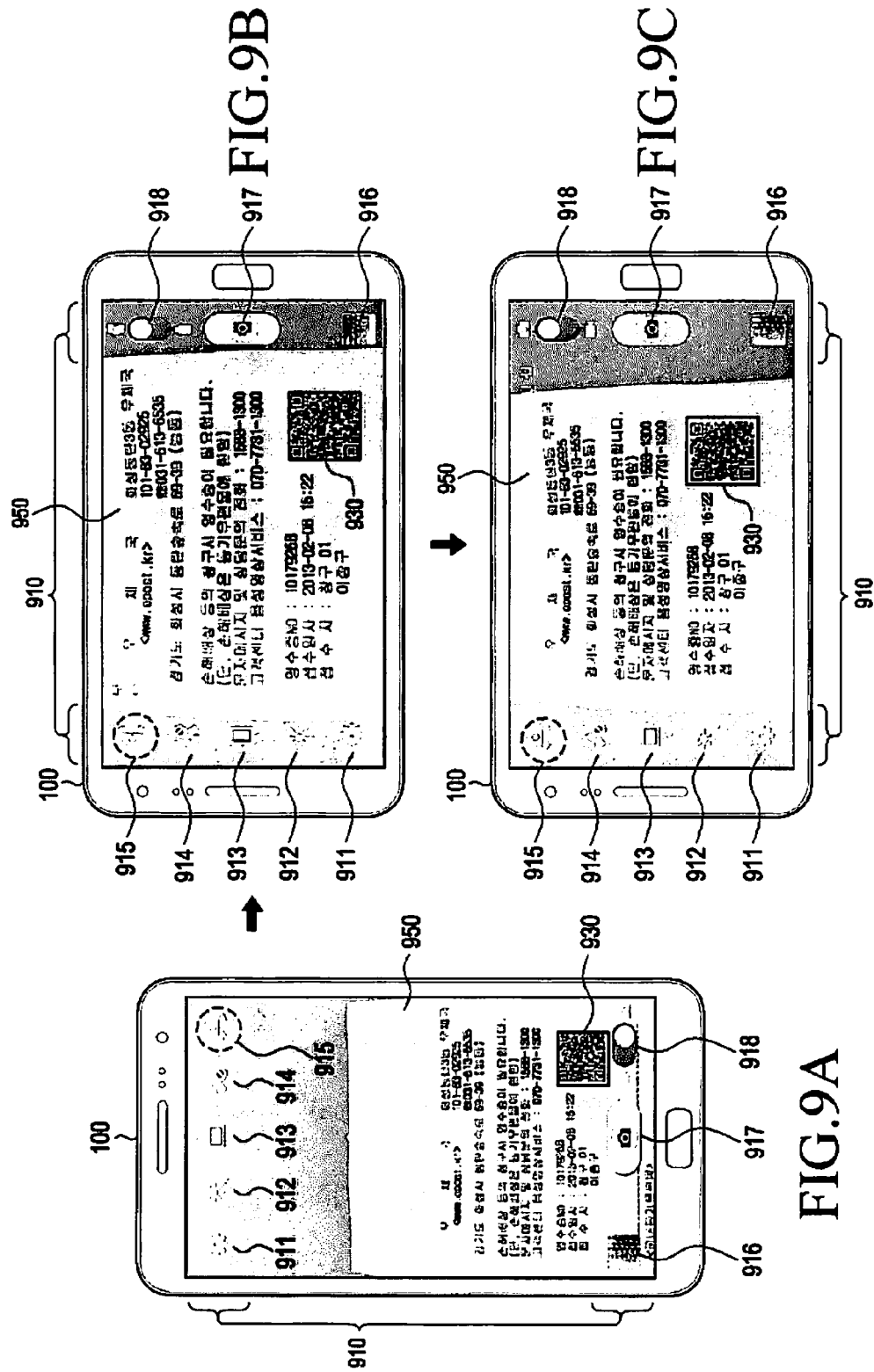

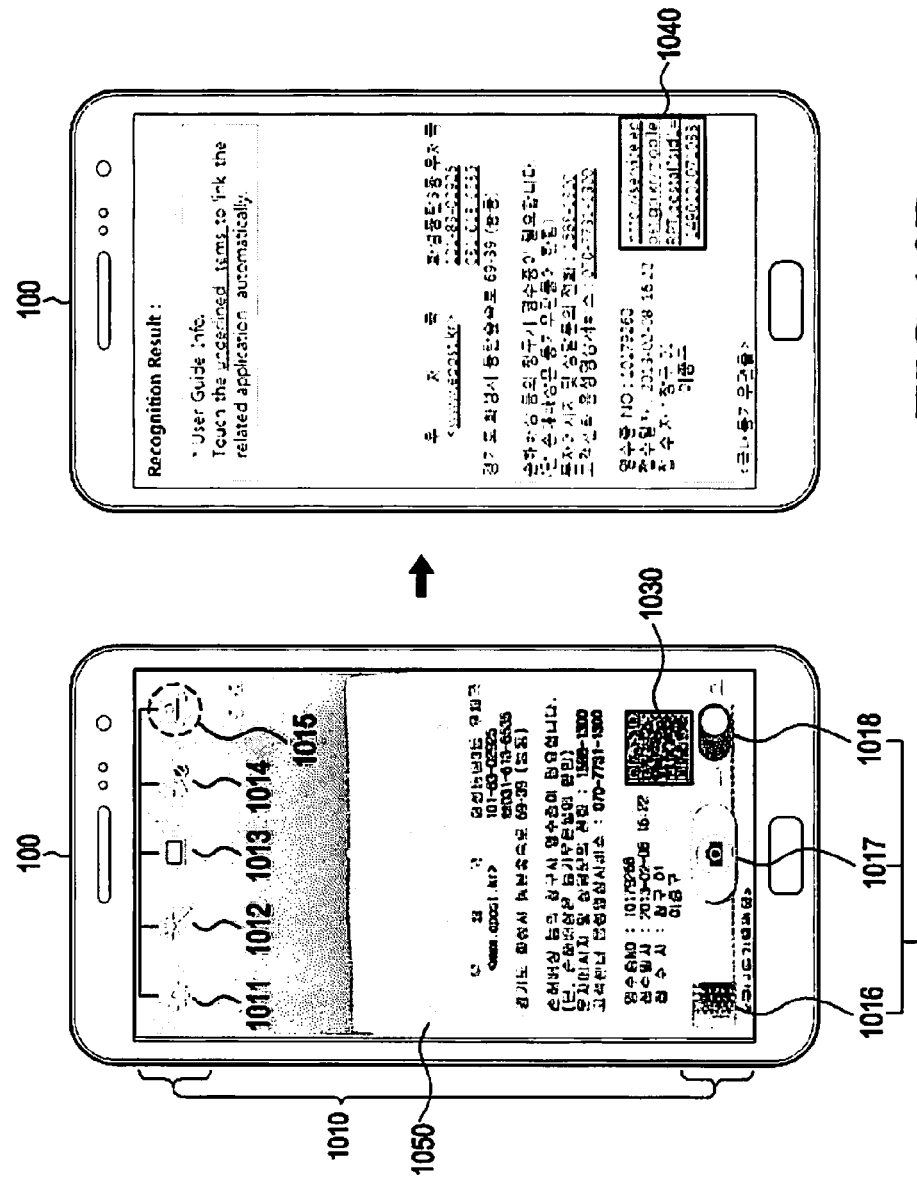

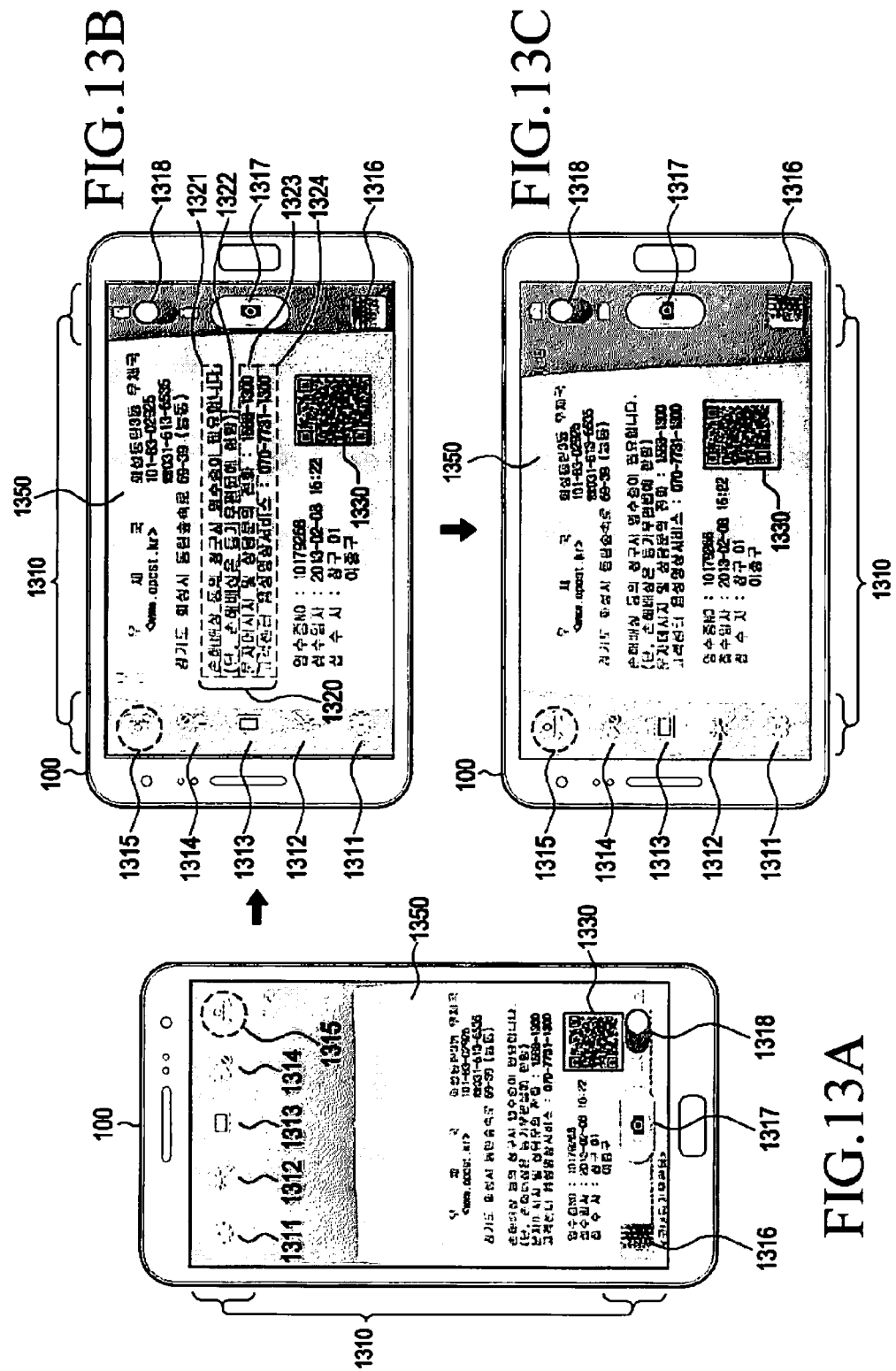

MOBILE TERMINAL AND CODE RECOGNITION METHOD THEREOF

PRIORITY

This application claims priority under 35 U.S.C. §119(a) to a Korean Patent Application filed in the Korean Intellectual Property Office on Aug. 28, 2013 and assigned Serial No. 10-2013-0102745, the entire content of which is incorporated herein by reference.

BACKGROUND

1. Field of the Invention

The present invention relates generally to a mobile terminal for recognizing a recognition code using a camera mounted therein, and more particularly, to a mobile terminal for adjusting a User Interface (UI) rotation angle of a code recognition application depending on the direction of a recognition code or text entered through a camera, to recognize the recognition code and text quickly and efficiently, and a code recognition method thereof.

2. Description of the Related Art

A bar code, which is a typical example of a currently used recognition code, has been widely used for the effective identification and management of the products by companies. In particular, the bar code has been used to quickly calculate the total price of goods sold at a store. The bar code corresponds to a one-dimensional code having a relatively small amount of information. The one-dimensional code may include the basic information of the product, but may not include a large amount of information such as history of the product and the like.

In order to overcome these shortcomings, a Quick Response (QR) code has been designed as a two-dimensional (2D) code. The QR code is a recognition code capable of recording a large amount of information (e.g., a maximum of 7089 numbers, 4296 characters, 1871 Chinese characters, and the like) in rows and columns. In line with an increase in the use of the QR code, a code recognition application for recognizing 2D codes including the QR code has been installed in a mobile terminal. Typically, the code recognition application may recognize a QR code using an image created by capturing the QR code with a camera mounted in the mobile terminal.

SUMMARY

The present invention has been made to solve at least the above-mentioned problems and/or disadvantages and to provide at least the advantages described below. Accordingly, an aspect of the present invention is to provide a mobile terminal for adjusting a User Interface (UI) rotation angle of a code recognition application depending on the direction of a recognition code or text entered through a camera, to recognize the recognition code and text quickly and efficiently, and a code recognition method thereof.

In accordance with an aspect of the present invention, a method for recognizing a recognition code in a mobile terminal is provided. The method includes detecting at least a portion of the recognition code from an image including the recognition code; determining a code rotation angle of the recognition code; and extracting the recognition code or a text from the image including the recognition code based on the code rotation angle of the recognition code.

In accordance with another aspect of the present invention, a mobile terminal for recognizing a recognition code is provided. The mobile terminal includes a camera module configured to receive an image including the recognition code; and a controller configured to: detect at least a portion of the recognition code from the image including the recognition code, determine a code rotation angle of the recognition code, and extract the recognition code or a text from the image including the recognition code based on the code rotation angle of the recognition code.

In accordance with another aspect of the present invention, a method for recognizing a recognition code in a mobile terminal is provided. The method includes detecting at least a portion of a recognition code from an image including the recognition code; determining a code rotation angle of the recognition code; determining whether a User Interface (UI) rotation angle of a code recognition application is equal to the determined code rotation angle of the recognition code; and if the UI rotation angle is not equal to the code rotation angle, rotating a UI of the code recognition application so that the UI rotation angle of the code recognition application is equal to the code rotation angle.

BRIEF DESCRIPTION OF THE DRAWINGS

The above and other aspects, features and advantages of certain exemplary embodiments of the present invention will be more apparent from the following description, taken in conjunction with the accompanying drawings, in which:

FIGS. 5A to 5D illustrate an example of a recognition code detected by the mobile terminal shown in FIG. 1;

FIGS. 9A to 9C illustrate yet another example of rotating a UI direction of a code recognition application in accordance with a code recognition method by the mobile terminal shown in FIG. 1;

FIGS. 10A and 10B illustrate an example of detecting a recognition code and a text in accordance with a code recognition method by the mobile terminal shown in FIG. 1;

FIGS. 13A to 13C illustrate yet another example of detecting a recognition code and a text in accordance with a code recognition method by the mobile terminal shown in FIG. 1.

Throughout the drawings, like reference numerals will be understood to refer to like parts, components, and structures.

DETAILED DESCRIPTION OF EMBODIMENTS OF THE PRESENT INVENTION

The following description with reference to the accompanying drawings is provided to assist in a comprehensive understanding of embodiments of the present invention as defined by the claims and their equivalents. It includes various specific details to assist in the understanding, but these are to be regarded as mere examples. Accordingly, those of ordinary skill in the art will recognize that various changes and modifications of the embodiments described herein can be made without departing from the scope and spirit of the present invention. In addition, descriptions of well-known functions and constructions may be omitted for clarity and conciseness.

The terms and words used in the following description and claims are not limited to their meanings in a dictionary, but, are merely used to enable a clear and consistent understanding of the present invention. Accordingly, it should be apparent to those skilled in the art that the following description of embodiments of the present invention is provided for illustration purposes only and not for the purpose of limiting the present invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The term "substantially" refers to that the recited characteristic, parameter, or value need not be achieved exactly, but that deviations or variations, including for example, tolerances, measurement error, measurement accuracy limitations, and other factors known to those of skill in the art, may occur in amounts that do not preclude the effect which the characteristic was intended to provide.

Figure 1:
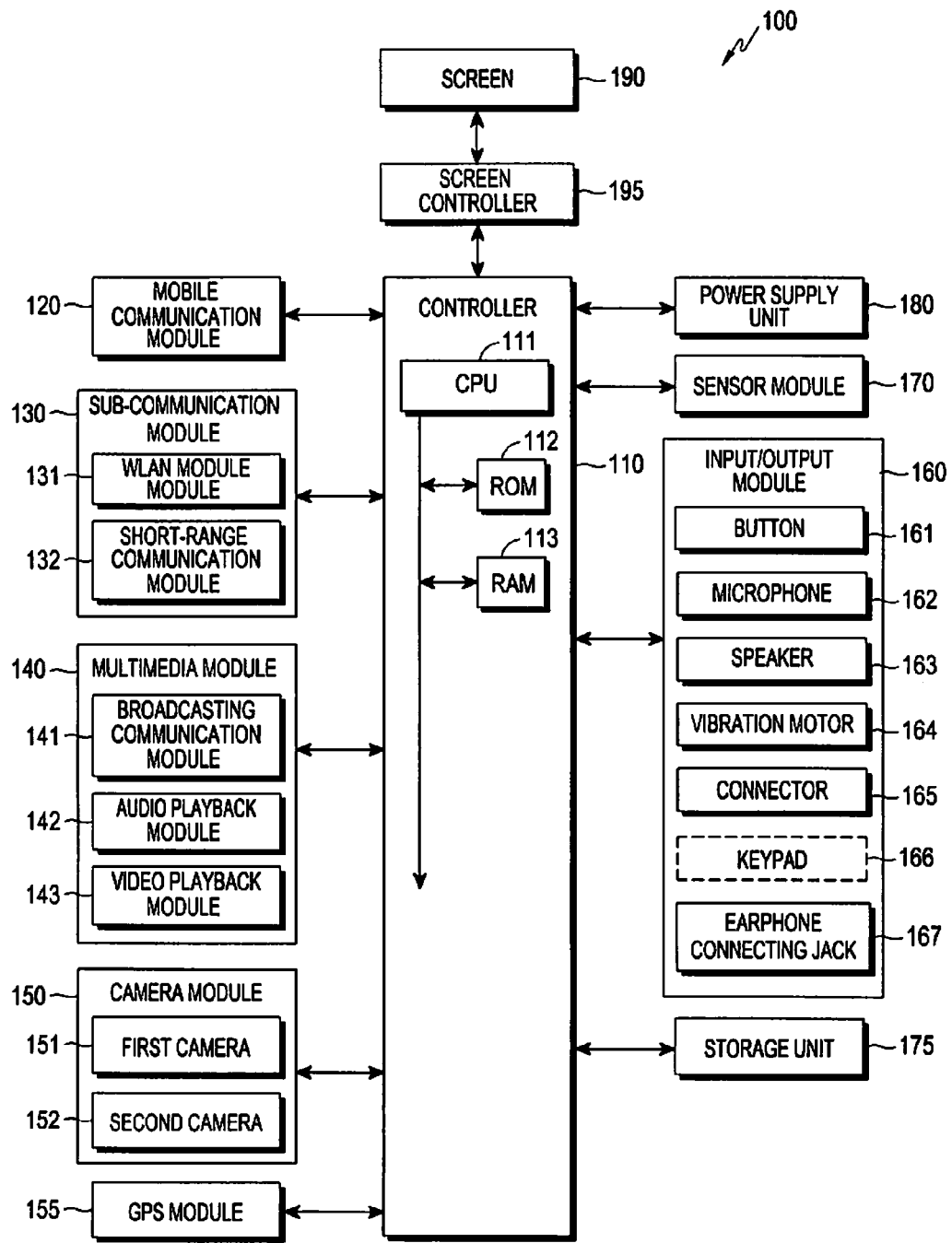
FIG. 1 illustrates a configuration of a mobile terminal according to an embodiment of the present invention.

FIG. 1 illustrates a configuration of a mobile terminal according to an embodiment of the present invention.

Referring to FIG. 1, a mobile terminal 100 includes at least one of a controller 110, a mobile communication module 120, a sub-communication module 130, a multimedia module 140, a camera module 150, a Global Positioning System (GPS) module 155, an Input/Output (I/O) module 160, a sensor module 170, a storage unit 175, a power supply unit 180, a screen 190, and a screen controller 195.

The controller 110 controls the overall operation of the mobile terminal 100. In accordance with an embodiment of the present invention, the controller 110 detects a recognition code (e.g., a one-dimensional recognition code including a bar code, or a 2D recognition code including a QR code) or a text from a code image created by the camera module 150. The operation mode in which the mobile terminal 100 detects a recognition code or a text will be referred to herein as a code recognition mode. The mobile terminal 100 may be switched to the code recognition mode as a code recognition application pre-stored or installed in the storage unit 175 is executed. The code recognition application may be pre-stored in the storage unit 175, or may be downloaded (or received and stored) from the outside through the mobile communication module 120 or the sub-communication module 130.

Upon entering the code recognition mode, the controller 110 controls the camera module 150 to capture a recognition code. The camera module 150 generates a code image including a recognition code by capturing the recognition code entered through a camera lens. The controller 110 detects the recognition code from the generated code image. Further, the controller 110 determines a rotation angle of the recognition code.

Figure 2:
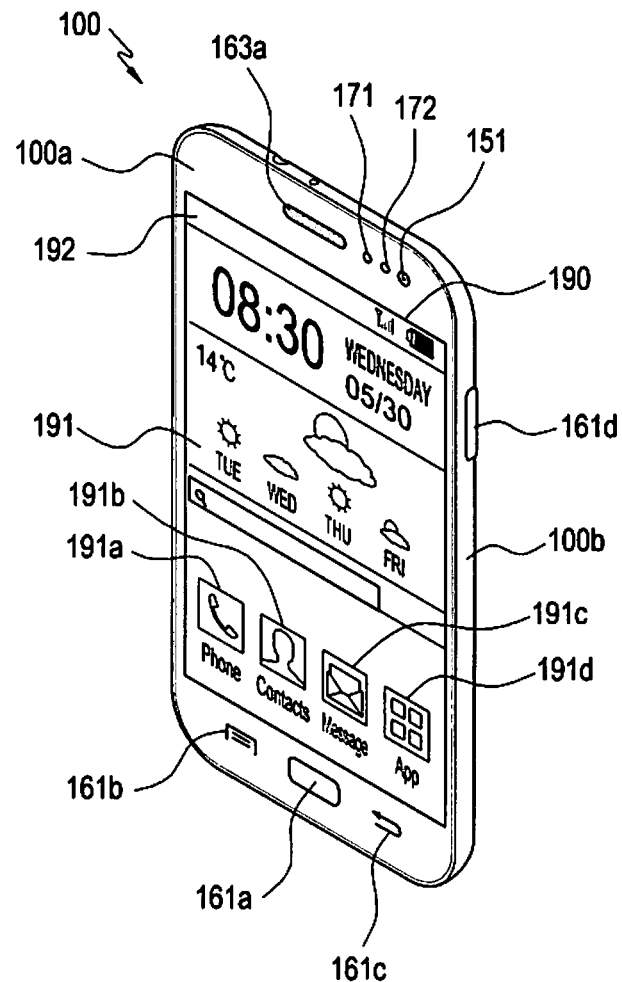
FIG. 2 is a front perspective view of a mobile terminal according to an embodiment of the present invention.

The direction of the mobile terminal 100 may be varied depending on the manipulation of its user. For example, when the mobile terminal 100 is perpendicular to the ground, with a Home button 161a situated in a lower portion of the mobile terminal 100, as illustrated in FIG. 2, a direction of the mobile terminal 100 will be assumed to be a normal direction, or a rotation angle of the mobile terminal 100 will be assumed to be a zero degree (0°). In a process of capturing a recognition code using the mobile terminal 100, the user may rotate the mobile terminal 100 (to be specific, the screen 190) by about 90° clockwise or counterclockwise. In this case, the rotation angle of the mobile terminal 100 may hardly be in the same direction as that of the rotation angle of the recognition code. As a result, the rotation angle of the mobile terminal 100 may be different from the rotation angle of the code image including the recognition code. Further, a User Interface (UI) of the code recognition application may also have a rotation angle different from the rotation angle of the code image, because the UI displayed on the mobile terminal 100 may be rotated by about 90° clockwise or counterclockwise like the mobile terminal 100.

An aspect of the present invention is to solve the problem that the mobile terminal 100 and the recognition code may be different from each other in terms of the rotation angle. Accordingly, in accordance with an embodiment of the present invention, the controller 110 controls the mobile terminal 100 to detect a rotation angle (hereinafter referred to as a code rotation angle) of a recognition code included in a code image, and to adjust a rotation angle (hereinafter referred to as a UI rotation angle) of a UI of a code recognition application depending on the code rotation angle of the recognition code. If the code rotation angle of the recognition code included in the code image is determined, the controller 110 determines a UI rotation angle for the UI of the code recognition application. The controller 110 controls the UI of the code recognition application so that the UI rotation angle is identical to the code rotation angle of the recognition code.

Further, in accordance with an embodiment of the present invention, the controller 110 detects the recognition code or a text based on the code rotation angle of the recognition code included in the code image. The controller 110 determines a scan direction of the camera module 150 depending on the code rotation angle of the recognition code. For example, if the code rotation angle of the recognition code is 0° (corresponding to the normal direction), the controller 110 controls the camera module 150 to scan in a top-to-bottom direction (or a vertical direction). Alternatively, if the code rotation angle of the recognition code is 90° (i.e., if the recognition code is rotated by 90° clockwise with respect to the normal direction), the controller 110 controls the camera module 150 to scan in a right-to-left direction (or a horizontal direction).

The controller 110 includes a Central Processing Unit (CPU) 111, a Read Only Memory (ROM) 112 that stores a control program for control of the mobile terminal 100, and a Random Access Memory (RAM) 113 that temporarily stores the signals or data received from the outside of the mobile terminal 100, and/or that is used as a workspace for operations performed in the mobile terminal 100. The CPU 111 may include a single-core processor, a dual-core processor, a triple-core processor, a quad-core processor, and the like. The CPU 111, the ROM 112 and the RAM 113 may be interconnected via an internal bus.

The controller 110 controls the mobile communication module 120, the sub-communication module 130, the multimedia module 140, the camera module 150, the GPS module 155, the I/O module 160, the sensor module 170, the storage unit 175, the power supply unit 180, the screen 190, and the screen controller 195.

The controller 110 controls the screen 190 to control a variety of content being displayed on the screen 190 or to control the display of the content. The controller 110 controls the mobile terminal 100 to perform an operation corresponding to a touch input (e.g., a user input) detected by the screen 190. Upon receiving a touch input that the user has made by touching at least one point on the screen 190, the controller 110 controls the mobile terminal 100 to perform an operation corresponding to the touch input.

The mobile communication module 120, under control of the controller 110, connects the mobile terminal 100 to external devices using at least one antenna. The mobile terminal 100 is connected to the external devices by mobile communication. The mobile communication module 120 transmits/receives wireless signals for voice calls, video calls, Short Message Service (SMS) messages, or Multimedia Messaging Service (MMS) messages, to/from a cellular phone, a smart phone, a tablet Personal Computer (PC) or other devices, a phone number of each of which is entered or registered in the mobile terminal 100.

The sub-communication module 130 includes at least one of a Wireless Local Area Network (WLAN) module 131 and a short-range communication module 132.

The WLAN module 131, under control of the controller 110, accesses the Internet in the place where a wireless Access Point (AP) is installed. In other words, the WLAN module 131 supports the wireless connection to the Internet by the mobile terminal 100. The WLAN module 131 supports the WLAN standard IEEE802.11x proposed by the Institute of Electrical and Electronic Engineers (IEEE). The short-range communication module 132, under control of the controller 110, performs wireless short-range communication between the mobile terminal 100 and an image forming apparatus. The short-range communication scheme includes Bluetooth, Infrared Data Association (IrDA), WiFi Direct, Near Field Communication (NFC), and the like.

Depending on its performance or structure, the mobile terminal 100 includes at least one of the mobile communication module 120, the WLAN module 131 and the short-range communication module 132. For example, depending on its performance or structure, the mobile terminal 100 may include a combination of the mobile communication module 120, the WLAN module 131 and the short-range communication module 132.

The multimedia module 140 includes at least one of a broadcasting communication module 141, a audio playback module 142, and a video playback module 143. The broadcasting communication module 141, under control of the controller 110, receives broadcast signals (e.g., TV broadcast signals, radio broadcast signals, data broadcast signals, and the like) and additional broadcast information (e.g., Electric Program Guide (EPG), Electric Service guide (ESG), and the like) that are transmitted from the broadcasting stations, via a broadcasting communication antenna. In accordance with an embodiment of the present invention, the broadcasting communication module 141 outputs, to the screen 190, the content data that the mobile terminal 100 has received via the mobile communication module 120. The audio playback module 142, under control of the controller 110, plays digital audio files (with an extension of, for example, mp3, wma, ogg, or wav) that are stored in the storage unit 175 or received from the outside. The video playback module 143, under control of the controller 110, plays digital video files (with an extension of, for example, mpeg, mpg, mp4, avi, mov, or mkv) that are stored in the storage unit 175 or received from the outside. The video playback module 143 plays digital audio files as well.

The multimedia module 140 may include the audio playback module 142 and the video playback module 143, excluding the broadcasting communication module 141. The audio playback module 142 and the video playback module 143 in the multimedia module 140 may be incorporated into the controller 110.

The camera module 150 includes at least one of the first camera 151 and the second camera 152, each of which captures still images or videos under control of the controller 110. The first camera 151 or the second camera 152 includes an auxiliary light source (e.g., a flash) that provides the light needed for photographing. The first camera 151 may be disposed on the front of the mobile terminal 100, and the second camera 152 may be disposed on the rear of the mobile terminal 100. In accordance with another embodiment of the present invention, the first camera 151 and the second camera 152 may be disposed on the same plane to be adjacent to each other, with a gap set to be greater than 1 centimeter (cm) and less than or equal to 8 centimeter (cm), making it possible to capture three-dimensional (3D) still images or videos.

In accordance with an embodiment of the present invention, the camera module 150 receives an image including a recognition code (e.g., 2D recognition code (e.g., a QR code)) or a text through a lens thereof, and generates a code image including the recognition code or text.

In accordance with an embodiment of the present invention, if the mobile terminal 100 enters the code recognition mode, the camera module 150 sequentially scans the image incoming through the lens, in a left-to-right direction, a right-to-left direction, a top-to-bottom direction, or a bottom-to-top direction. The camera module 150 generates a code image by scanning the image including a recognition code. If the camera module 150 generates the code image by scanning, the code image is delivered to a code recognizer 402 in the controller 110 even though the code image is not a code image generated by fully scanning the image. In other words, for example, if 50% of the recognition code has been scanned, a code image including 50% of the recognition code is delivered to the code recognizer 402. Subsequently, if 10% of the recognition code has been further scanned, the camera module 150 delivers the code image including 60% of the recognition code to the code recognizer 402. Similarly, the camera module 150 may deliver a code image including some or all texts to a text recognizer 404 in the controller 110.

The GPS module 155 receives radio waves from a plurality of GPS satellites in the Earth orbit, and calculates the location of the mobile terminal 100 using the Time of Arrival (ToA) from the GPS satellites to the mobile terminal 100.

The I/O module 160 includes at least one of the plurality of a button(s) 161, a microphone (MIC) 162, a speaker (SPK) 163, a vibration motor 164, a connector 165, a keypad 166, and an earphone connecting jack 167. In accordance with an embodiment of the present invention, the I/O module 160 receives a user input for entering the code recognition mode. Further, the I/O module 160 receives, from the user, a user input for executing a code recognition application and a user input for scanning or capturing an image including a recognition code or a text by driving the camera module 150.

The button(s) 161 may be formed on the front, rear or side of a housing of the mobile terminal 100, and includes at least one of a Power/Lock button, a Volume button, a Menu button, a Home button, a Back button, and a Search button.

The microphone 162, under control of the controller 110, generates an electrical signal by receiving voices or sounds.

The speaker 163, under control of the controller 110, outputs, to the outside of the mobile terminal 100, the sounds corresponding to various signals (e.g., wireless signals, broadcast signals, digital audio files, digital video files, photographing tones, and the like) from the mobile communication module 120, the sub-communication module 130, the multimedia module 140, or the camera module 150. The speaker 163 outputs the sounds (e.g., button manipulation tones or ring back tones for calls) corresponding to the unique function of the mobile terminal 100. One or multiple speakers 163 may be formed in a proper position or positions of the housing of the mobile terminal 100.

The vibration motor 164, under control of the controller 110, converts an electrical signal into mechanical vibrations. For example, upon receiving a voice call from another device, the mobile terminal 100 in a vibration mode operates or activates the vibration motor 164. One or multiple vibration motors 164 may be formed in the housing of the mobile terminal 100. The vibration motor 164 operates (or generate vibrations) in response to the user's touch gesture of making a touch on the screen 190, and the continuous movement of the touch on the screen 190.

The connector 165 is used as an interface for connecting the mobile terminal 100 to external devices or a power source. The mobile terminal 100, under control of the controller 110, transmits the data stored in the storage unit 175 of the mobile terminal 100 to the external devices or receives data from the external devices, via a wired cable connected to the connector 165. The mobile terminal 100 receives power from the power source or charges its rechargeable battery with the power source, via the wired cable connected to the connector 165.

The keypad 166 receives a key input from the user, for control of the mobile terminal. The keypad 166 includes a physical keypad formed on the mobile terminal 100 or a virtual keypad displayed on the screen 190. The physical keypad formed on the mobile terminal 100 is optional depending on the performance or structure of the mobile terminal 100.

An earphone may be inserted into the earphone connecting jack 167, and connected to the mobile terminal 100.

The sensor module 170 includes at least one sensor for detecting a state of the mobile terminal 100. For example, the sensor module 170 may include a proximity sensor for detecting the user's proximity to the mobile terminal 100, an illuminance sensor for detecting the amount of light around the mobile terminal 100, a motion sensor for detecting the movement (e.g., the rotation, acceleration, vibrations, and the like) of the mobile terminal 100, a geo-magnetic sensor for detecting the point of the compass using the Earth's magnetic field, a gravity sensor for detecting the direction of the gravity, an altimeter for detecting the altitude by measuring the atmospheric pressure, and the like. At least one sensor detects a state of the mobile terminal 100, generates a signal corresponding to the detection, and transfers the signal to the controller 110. Sensors may be added to or removed from the sensor module 170 depending on the performance of the mobile terminal 100.

In accordance with an embodiment of the present invention, the sensor module 170 includes a proximity sensor. The proximity sensor is a sensor for detecting the user's movement (e.g., the movement of the user's finger) that is detected within a predetermined range as being in proximity to the screen 190. For example, if the screen 190 is implemented in a capacitive type, the sensor module 170 that is implemented as a proximity sensor, detects the user's movement by detecting a change in capacitance that occurs within a predetermined range (e.g., the height of 10 centimeter (cm) from the screen 190) on the screen 190. The detected user's movement is also a type of the user input.

The storage unit 175, under control of the controller 110, stores the signals or data that are input/output in response to operations of the mobile communication module 120, the sub-communication module 130, the multimedia module 140, the camera module 150, the GPS module 155, the I/O module 160, the sensor module 170, and the screen 190. The storage unit 175 stores a control program and applications for control of the mobile terminal 100 or the controller 110.

The term "storage unit" may be construed to include the storage unit 175, the ROM 112 and the RAM 113 in the controller 110, or a memory card (e.g., a Secure Digital (SD) card, a memory stick, and the like) mounted in the mobile terminal 100. The storage unit 175 includes a non-volatile memory, a volatile memory, a Hard Disk Drive (HDD), a Solid State Drive (SSD), and the like.

The power supply unit 180, under control of the controller 110, supplies power to one or multiple batteries disposed on the housing of the mobile terminal 100. The one or multiple batteries supply power to the mobile terminal 100. The power supply unit 180 supplies, to the mobile terminal 100, the power that is received from the external power source via a wired cable connected to the connector 165. The power supply unit 180 supplies, to the mobile terminal 100, the power that is wirelessly received from the external power source by wireless charging technology.

The screen 190 displays the data stored in the mobile terminal 100. In accordance with an embodiment of the present invention, the screen 190, which is implemented in the form of a touch screen, receives from the user a user input (e.g., a touch input) that the user makes by touching the screen 190 with a part (e.g., a finger) of his/her body. The screen 190 provides the user with user interfaces corresponding to a variety of services (e.g., calls, data transfer, broadcasting, photographing, and the like). The screen 190 transfers an analog signal (e.g., a touch input) corresponding to at least one touch made on a user interface, to the screen controller 195. The screen 190 receives at least one touch made by the user's body (e.g., fingers including the thumb) or a touch input means (e.g., a stylus pen). The screen 190 receives the continuous movement of at least one touch. The screen 190 transfers an analog signal corresponding to the continuous movement of the touch input to the screen controller 195.

In the present invention, the term "touch" is not limited to the direct contact (or contact touch) between the screen 190 and the user's body or the touch input means, but may also include an indirect contact (or noncontact touch) between the screen 190 and the user's body or the touch input means, with a detectable gap set to be less than or equal to 1 millimeter (mm)). The detectable gap of the screen 190 is subject to change depending on the performance or the structure of the mobile terminal 100.

The screen 190 is implemented in, for example, a resistive type, a capacitive type, an infrared type, or an acoustic wave type.

The screen controller 195 converts an analog signal received from the screen 190 into a digital signal (e.g., X and Y coordinates), and transfers the digital signal to the controller 110. The controller 110 controls the screen 190 using the digital signal received from the screen controller 195. For example, the controller 110 selects or executes a shortcut icon displayed on the screen 190 in response to a touch. The screen controller 195 may be implemented to be incorporated into the controller 110.

In accordance with an embodiment of the present invention, the screen controller 195 extracts the coordinates on the screen 190 in response to a proximity sensing input detected by the sensor module 170. For example, it will be assumed that a proximity sensing input for selecting one point (e.g., a first point) within a predetermined range as being in proximity to the screen 190 is detected by the sensor module 170. In addition, it will be assumed that the proximity sensing is implemented in a capacity way. The sensor module 170 detects a change in capacitance that occurs within a predetermined range on the screen 190, and the controller 110 controls the screen controller 195 to extract the coordinates of a point (e.g., a second point) on the screen 190, which corresponds to the point (e.g., the first point) where the capacitance is changed. For example, the second point is one point on the screen 190, which is closest to the first point.

In accordance with an embodiment of the present invention, the mobile terminal 100 may be connected to the external devices using external device connection units such as the sub-communication module 130, the connector 165, and the earphone connector 167.

The external devices may include various devices such as an earphone, an external speaker, a Universal Serial Bus (USB) memory, a charger, a cradle/dock, a Digital Multimedia Broadcasting (DMB) antenna, a mobile payment device, a healthcare device (e.g., a blood glucose meter and the like), a game console, a car navigation device and the like, each of which can be detachably connected to the mobile terminal 100 by wires. In addition, the external devices may include short-range communication devices such as a Bluetooth device, a NFC device, a WiFi Direct device, a wireless AP, and the like, each of which can be wirelessly connected to the mobile terminal 100 by short-range communication. Further, the external devices may include other devices, cellular phones, smart phones, tablet PCs, desktop PCs, servers, and the like.

Figure 3:
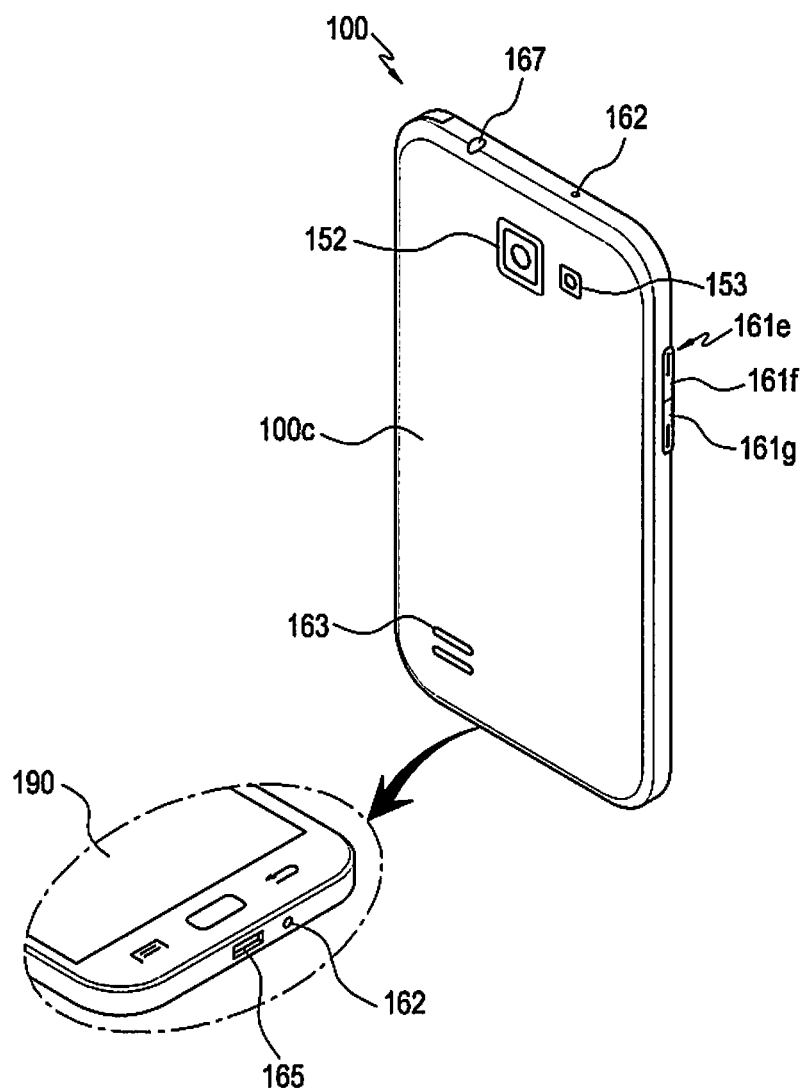
FIG. 3 is a rear perspective view of a mobile terminal according to an embodiment of the present invention.

FIG. 2 is a front perspective view of a mobile terminal according to an embodiment of the present invention, and FIG. 3 is a rear perspective view of a mobile terminal according to an embodiment of the present invention.

Referring to FIG. 2, the screen 190 is disposed in the center of a front 100a of the mobile terminal 100. The screen 190 is formed large enough to occupy most of the front 100a of the mobile terminal 100.

In the example of FIG. 2, a main home screen is displayed on the screen 190. The main home screen is the first screen that is displayed on the screen 190 when the mobile terminal 100 is powered on. When the mobile terminal 100 has different home screens of several pages, the main home screen is the first home screen among the home screens of several pages. On the main home screen, shortcut icons 191a, 191b and 191c for executing the frequently used applications, a Switch-to-Main Menu icon (or Apps icon) 191d, the time, the weather, and the like, may be displayed. The Switch-to-Main Menu icon 191d is used to display a menu screen on the screen 190. On top of the screen 190, a status bar 192 for displaying the status of the mobile terminal 100, such as the battery level, the received signal strength, the current time, and the like, may be formed.

Under the screen 190, a Home button 161a, a Menu button 161b, and a Back button 161c may be formed. The Home button 161a is used to display the main home screen on the screen 190. For example, if the Home button 161a is touched by the user while any home screen other than the main home screen or a menu screen is displayed on the screen 190, the main home screen is displayed on the screen 190. If the Home button 161a is touched by the user while applications are executed on the screen 190, the main home screen as shown in FIG. 2 is displayed on the screen 190. Further, the Home button 161a is used to display the recently used application or a task manager on the screen 190.

The Menu button 161b is used to provide connection menus that can be used on the screen 190. The connection menus may include an Add Widget menu, a Change Wallpaper menu, a Search menu, an Edit menu, a Preferences menu, and the like.

The Back button 161c is used to display the screen which was displayed just before the current screen, or to terminate the last used application.

On an edge of the front 100a of the mobile terminal 100, the first camera 151, an illuminance sensor 171, and a proximity sensor 172, may be disposed. On a rear 100c of the mobile terminal 100, the second camera 152, a flash 153, and the speaker 163 may be disposed.

On a side 100b of the mobile terminal 100, a Power/Reset button 161d, a Volume button 161e (including a Volume-Up button 161f and a Volume-Down button 161g), a DMB antenna, one or multiple microphones 162, and the like, may be disposed. The DMB antenna (not shown) may be detachably fixed to or formed in the mobile terminal 100.

The connector 165 is formed in the bottom of the mobile terminal 100. A plurality of electrodes are formed in the connector 165, and connected to the external devices by wires. The earphone jack 167 is formed in the top of the mobile terminal 100. An earphone may be inserted into the earphone jack 167.

Figure 4:
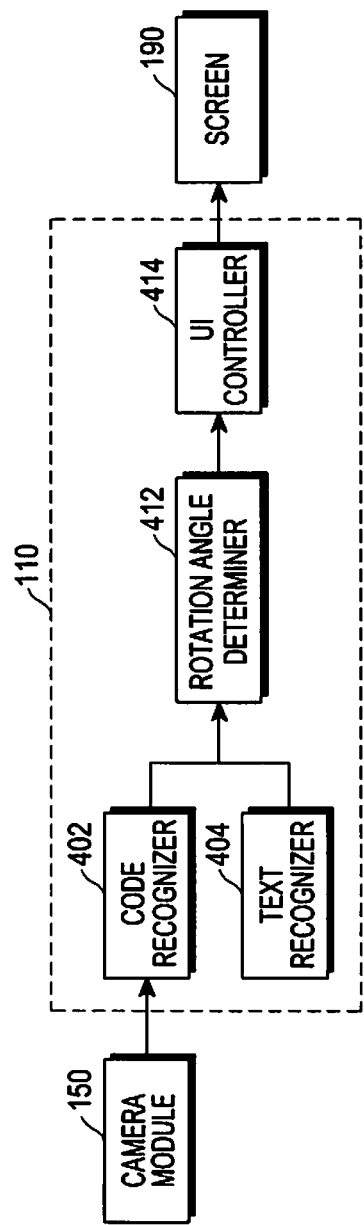
FIG. 4 illustrates a configuration of a controller in the mobile terminal shown in FIG. 1.

FIG. 4 illustrates a configuration of a controller in the mobile terminal shown in FIG. 1. In FIG. 4, the controller 110 is illustrated together with the camera module 150 and the screen 190, for convenience of description.

Referring to FIG. 4, the controller 110 includes a code recognizer 402, a rotation angle determiner 412, and a UI controller 414, and may further include a text recognizer 404.

If the mobile terminal 100 enters the code recognition mode, the camera module 150 generates a code image including a recognition code by capturing the recognition code that is entered through a lens. If the code image is generated, the code recognizer 402 detects at least a portion of the recognition code from the code image. The code recognizer 402 extracts the recognition code from the code image.

The text recognizer 404 detects at least a portion of a text from the code image. In accordance with an embodiment of the present invention, the text recognizer 404 detects the form of the text included in the code image based on the code rotation angle of the recognition code, which is determined by the rotation angle determiner 412. The text recognizer 404 detects the form of the text printed around a one-dimensional recognition code (e.g., a bar code), and detects the form of the text printed around a 2D recognition code (e.g., a QR code). The text recognizer 404 extracts the text.

The rotation angle determiner 412 determines a code rotation angle of the recognition code included in the code image. In addition, the rotation angle determiner 412 determines a UI rotation angle of the code recognition application. As mentioned above, when the mobile terminal 100 stands upright in perpendicular to the ground, a direction of the mobile terminal 100 will be assumed to be a normal direction (corresponding to a rotation angle of 0°) of the mobile terminal 100. Similarly, when the mobile terminal 100 stands upright in perpendicular to the ground, a UI rotation angle of the code recognition application will also be assumed to be 0°.

The rotation angle determiner 412 compares the code rotation angle of the recognition code included in the code image with the UI rotation angle of the code recognition application.

The rotation angle determiner 412 determines whether the UI rotation angle is equal to the code rotation angle. If the UI rotation angle is equal to the code rotation angle, the rotation angle determiner 412 determines not to rotate the UI of the code recognition application. Alternatively, if the UI rotation angle is not equal to the code rotation angle, the rotation angle determiner 412 determines to rotate the UI of the code recognition application. In accordance with an embodiment of the present invention, the controller 110 rotates the UI of the code recognition application so that the UI rotation angle is equal to the code rotation angle.

As such, the rotation angle determiner 412 determines whether to rotate the UI of the code recognition application. For example, when the UI rotation angle of the code recognition application is in a direction that is rotated clockwise by 90° with respect to the code rotation angle of the recognition code, the rotation angle determiner 412 determines to rotate the UI of the code recognition application counterclockwise by 90°. As described above, the rotation angle determiner 412 not only determines whether to rotate the UI of the code recognition application, but also determines the angle (or degree) by which the rotation angle determiner 412 will rotate the UI of the code recognition application.

Although the recognition code may be a 2D recognition code (e.g., a QR code), the recognition code may also be a one-dimensional recognition code (e.g., a bar code) in another embodiment of the present invention. The bar code may be a combination of vertical bars having different thickness. The top and bottom of the bar code may be distinguished by the lengths of the vertical bars included in the bar code. That is, some of the vertical bars included in the bar code is formed longer than the other vertical bars in the down direction (i.e., the bottom of the bar code). Accordingly, the rotation angle determiner 412 first determines the direction in which the bars of the bar code stand vertically (e.g., the direction in which the code rotation angle of the bar code is 0° or 180°), and then, determines the code rotation angle of the bar code with respect to the normal direction (corresponding to a rotation angle of 0°) of the bar code, by referring to the lengths of the bars included in the bar code.

For example, the bar code is rotated clockwise by 90° with respect to the normal direction (corresponding to the rotation angle of 0°), i.e., the code rotation angle of the bar code is 90°. That is, the vertical bars included in the bar code are formed in the horizontal direction. The rotation angle determiner 412 determines that the code rotation angle of the bar code is 90° or 270°, based on the vertical bars formed in the horizontal direction. The rotation angle determiner 412 determines the side, in which some of the vertical bars included in the bar code are projected, as the bottom side of the bar code. In the above example, since the code rotation angle of the bar code is 90°, the bar code is in a form in which some of the vertical bars are projected in the left direction. The rotation angle determiner 412 determines the code rotation angle of the bar code as 90°, judging that some of the vertical bars are projected in the left direction.

The UI controller 414 rotates the UI of the code recognition application based on the code rotation angle or the UI rotation angle determined by the rotation angle determiner 412. As described in the above example, if the rotation angle determiner 412 determines to rotate the UI of the code recognition application counterclockwise by 90°, the UI controller 414 rotates the UI of the code recognition application counterclockwise by 90°. The screen 190 displays the UI that is rotated counterclockwise by 90°. In accordance with an embodiment of the present invention, the UI controller 414 controls the screen 190 to display the UI of the code recognition application by rotating the UI of the code recognition application counterclockwise by 90°.

In accordance with an embodiment of the present invention, the UI controller 414 may be implemented to be incorporated into the screen controller 195, to control the screen 190.

FIGS. 5A to 5D illustrate an example of a recognition code detected by the mobile terminal shown in FIG. 1.

In FIGS. 5A to 5D, a QR code is illustrated as an example of a recognition code. FIG. 5A illustrates a recognition code 501 that is in the normal direction and has a code rotation angle of 0°. FIG. 5B illustrates a recognition code 502 that is rotated counterclockwise by 90° with respect to the normal direction and has a code rotation angle of 270°. FIG. 5C illustrates a recognition code 503 that is rotated clockwise by 90° with respect to the normal direction and has a code rotation angle of 90°. FIG. 5D illustrates a recognition code 504 that is rotated by 180° with respect to the normal direction and has a code rotation angle of 180°.

A QR code generally includes symbols for defining the normal direction of the QR code. The positions of the symbols for defining the normal direction of the QR code correspond to three corners except for the lower right corner among the four corners of the square QR code. In FIGS. 5A to 5D, the recognition codes 501, 502, 503 and 504 (e.g., QR codes) each also include a first symbol 511, a second symbol 512 and a third symbol 513 as the symbols for defining the normal direction.

The rotation angle determiner 412 determines code rotation angles of the recognition codes 501, 502, 503 and 504 using the first to third symbols 511, 512 and 513. As illustrated in FIG. 5A, if the code rotation angle of the recognition code 501 is 0° or corresponds to the normal direction, the first and second symbols 511 and 512 are located in the upper left and right of the recognition code 501, respectively, and the third symbol 513 is located in the lower left of the recognition code 501. As illustrated in FIG. 5B, if the code rotation angle of the recognition code 502 is 270° or corresponds to the state in which the recognition code 501 is rotated counterclockwise by 90°, the second symbol 512 is located in the upper left of the recognition code 502, and the first and third symbols 511 and 513 are located in the lower left and right of the recognition code 502, respectively. As illustrated in FIG. 5C, if the code rotation angle of the recognition code 503 is 90° or corresponds to the state in which the recognition code 501 is rotated clockwise by 90°, the third and first symbols 513 and 511 are located in the upper left and right of the recognition code 503, respectively, and the second symbol 512 is located in the lower right of the recognition code 503. As illustrated in FIG. 5D, if the code rotation angle of the recognition code 504 is 180° or corresponds to the state in which the recognition code 501 is rotated by 180°, the third symbol 513 is located in the upper right of the recognition code 504, and the second and first symbols 512 and 511 are located in the lower left and right of the recognition code 504, respectively.

If the code recognizer 402 detects the recognition codes 501, 502, 503 and 504 shown in FIGS. 5A to 5D from the code image, the rotation angle determiner 412 determines a code rotation angle for each of the recognition codes 501, 502, 503 and 504.

In accordance with an embodiment of the present invention, the camera module 150 scans an image including the recognition code 501, 502, 503 or 504 in the left-to-right direction or the top-to-bottom direction. If at least one of the first to third symbols 511, 512 and 513 is deleted, the code recognizer 402 determines an image including the first to third symbols 511, 512 and 513 or a text as the recognition code 501, 502, 503 or 504.

Assuming that the camera module 150 scans in the top-to-bottom direction, if the symbol 512 (or 513) exists only in the upper left (or upper right) of the recognition code 502 (or 504) as illustrated in FIG. 5B (or FIG. 5D), the rotation angle determiner 412 determines the code rotation angle of the recognition code 502 (or 504) even though the camera module 150 does not scan the whole of the recognition code 502 (or 504).

Similarly, assuming that the camera module 150 scans in the bottom-to-top direction, if the symbol 513 (or 512) exists only in the lower left (or lower right) of the recognition code 501 (or 503) as illustrated in FIG. 5A (or FIG. 5C), the rotation angle determiner 412 determines the code rotation angle of the recognition code 501 (or 503) even though the camera module 150 does not scan the whole of the recognition code 501 (or 503).

Alternatively, assuming that the camera module 150 scans in the left-to-right direction, if the symbol 513 (or 512) exists only in the upper left (or lower left) of the recognition code 503 (or 504) as illustrated in FIG. 5C (or FIG. 5D), the rotation angle determiner 412 determines the code rotation angle of the recognition code 503 (or 504) even though the camera module 150 does not scan the whole of the recognition code 503 (or 504).

Similarly, assuming that the camera module 150 scans in the right-to-left direction, if the symbol 512 (or 513) exists only in the upper right (or lower right) of the recognition code 501 (or 502) as illustrated in FIG. 5A (or FIG. 5B), the rotation angle determiner 412 determines the code rotation angle of the recognition code 501 (or 502) even though the camera module 150 does not scan the whole of the recognition code 501 (or 502).

Figure 6:
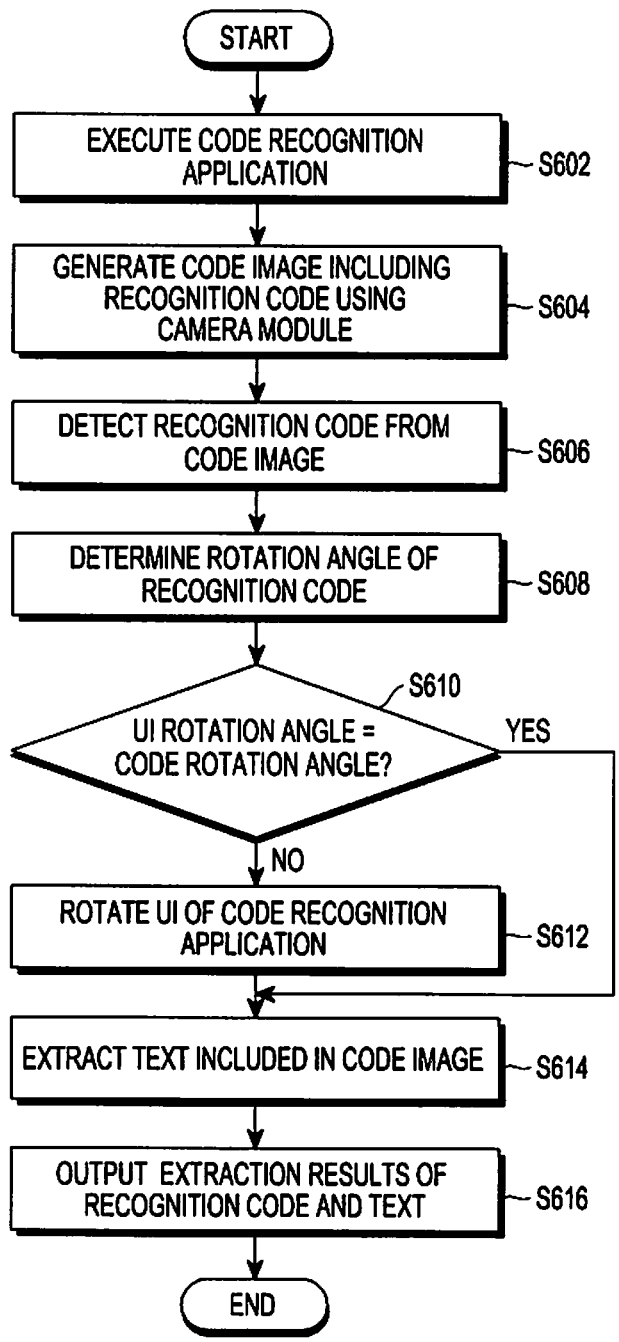
FIG. 6 is a flowchart illustrating an example of a code recognition method by the mobile terminal shown in FIG. 1.

FIG. 6 is a flowchart illustrating an example of a code recognition method by the mobile terminal shown in FIG. 1.

Referring to FIG. 6, the controller 110 of the mobile terminal 100 executes a code recognition application in step S602. In accordance with an embodiment of the present invention, step S602 is performed when the I/O module 160 or the screen 190 receives a user input for entering the code recognition mode or a user input for executing a code recognition application, from the user. If the code recognition application is executed, the camera module 150 that interworks with the code recognition application performs a photographing operation. The camera module 150 is driven in response to a user input for driving the camera module 150, or is driven automatically without any separate user input. The camera module 150 receives an image in real time using a lens. If the code recognition application is executed, a UI of the code recognition application may be displayed on the screen 190.

If the code recognition application is executed, the mobile terminal 100 generates a code image including a recognition code using the camera module 150 in step S604. The user moves the first camera 151 or the second camera 152 of the camera module 150 by moving the mobile terminal 100. The user moves the mobile terminal 100 so that an image including a recognition code is entered to the first camera 151 or the second camera 152, and then, enters a user input for photographing or scanning to the mobile terminal 100. In accordance with an embodiment of the present invention, if the mobile terminal 100 enters the code recognition mode, the camera module 150 converts the image that is received in real time through the first camera 151 or the second camera 152, into a code image, even though a user input for photographing or scanning is not received from the user.

If the code image is generated by the camera module 150, the code recognizer 402 detects a recognition code from the code image in step S606. If the recognition code is a two-dimensional recognition code (e.g., a QR code), the code recognizer 402 detects the recognition codes 501, 502, 503 and 504 as shown in FIGS. 5A to 5D, from the code image. In accordance with an embodiment of the present invention, the code recognizer 402 detects the recognition codes 501, 502, 503 and 504 as shown in FIGS. 5A to 5D from the code image by detecting at least one of the first to third symbols 511, 512 and 513.

In accordance with an embodiment of the present invention, if the recognition code is a one-dimensional recognition code (e.g., a bar code), the code recognizer 402 detects a plurality of vertical bars, which are formed in the horizontal direction or the vertical direction. The code recognizer 402 detects the direction in which vertical bars, which are projected only in one direction, are projected.

If the recognition code is detected from the code image, the rotation angle determiner 412 determines a code rotation angle of the recognition code in step S608. The rotation angle determiner 412 determines in step S610 whether a UI rotation angle of the code recognition application is equal to the code rotation angle of the recognition code.

If it is determined in step S610 that the UI rotation angle of the code recognition application is not equal to the code rotation angle of the recognition code, the rotation angle determiner 412 determines to match the UI rotation angle of the code recognition application with the code rotation angle of the recognition code. Accordingly, in step S612, the UI controller 414 rotates the UI of the code recognition application so that the UI of the code recognition application has the same rotation angle as the code rotation angle of the recognition code. For example, if it is assumed that the UI of the code recognition application is in a direction that is rotated counterclockwise by 90° with respect to the code rotation angle of the recognition code, the UI controller 414 rotates the UI of the code recognition application clockwise by 90° in step S612.

In step S614, the text recognizer 404 in the controller 110 extracts a text included in the code image. If the text is extracted, the controller 110 controls the screen 190 to output extraction results of the recognition code and the text in step S616. In step S616, the screen 190 may simply display the recognition code and the text in the form of image or text.

In accordance with another embodiment of the present invention, the controller 110 controls the mobile terminal 100 to perform an operation corresponding to the recognition code or text as the recognition code or text detection results. For example, if the information included in the recognition code is about an Internet address, the controller 110 controls the mobile terminal 100 to display a web page corresponding to the Internet address on the screen 190.

If it is determined in step S610 that the UI rotation angle of the code recognition application is equal to the code rotation angle of the recognition code, the text recognizer 404 in the controller 110 extracts a text included in the code image in step S614. If the text included in the code image is extracted, the controller 110 controls the screen 190 to output extraction results of the recognition code and the text in step S616.

Figure 7A:
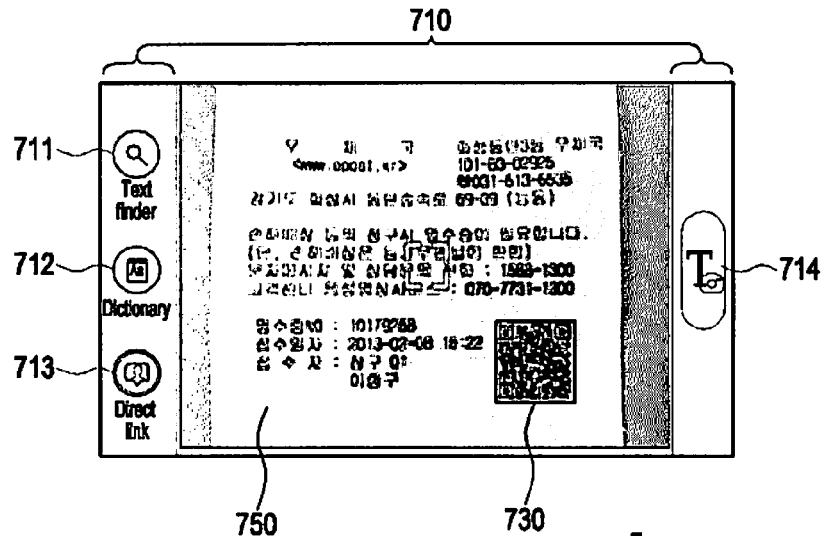
FIGS. 7A to 7C illustrate an example of rotating a UI direction of a code recognition application in accordance with a code recognition method by the mobile terminal shown in FIG. 1.
Figures 7B, 7C:
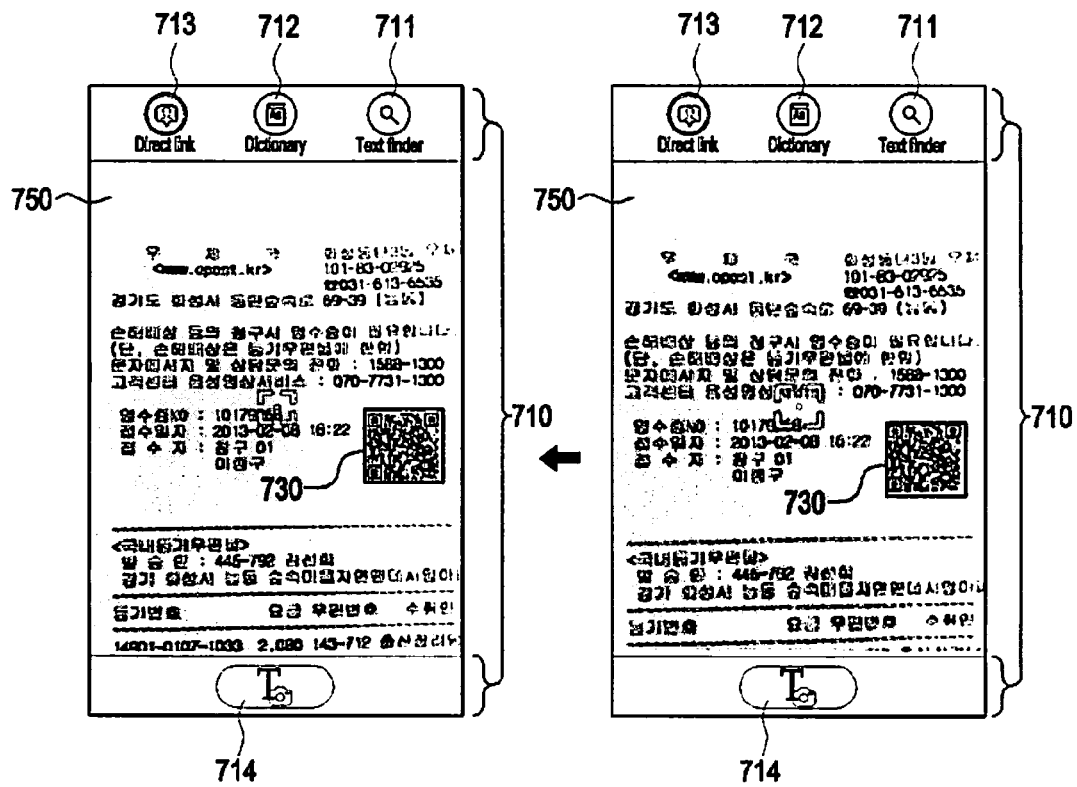

FIGS. 7A to 7C illustrate an example of rotating a UI direction of a code recognition application in accordance with a code recognition method by the mobile terminal shown in FIG. 1. FIGS. 7A, 7B and 7C show, in a chronological order, the screen 190 of the mobile terminal 100 that has driven a code recognition application in the code recognition mode.

Referring to FIGS. 7A to 7C, on the screen 190, a UI 710 of a code recognition application is displayed including icons 711, 712, 713 and 714 corresponding to the functions of detecting a recognition code or a text. In addition, on the screen 190, an image 750 that is being entered through the camera module 150 is displayed. The image 750 includes a recognition code 730. It will be assumed that a rotation angle of the recognition code 730 shown in all of FIGS. 7A to 7C is 0° or corresponds to the normal direction.

FIG. 7A shows the screen 190 when the code rotation angle of the recognition code 730 is equal to the UI rotation angle of the UI 710 of the code recognition application. FIG. 7B shows the screen 190 when the user has rotated the mobile terminal 100 in FIG. 7A clockwise by 90°. As the mobile terminal 100 is rotated clockwise by 90°, the code rotation angle of the recognition code 730 is not equal to the UI rotation angle of the UI 710 of the code recognition application as illustrated in FIG. 7B. In FIG. 7B, the UI rotation angle of the UI 710 is in a direction that is rotated clockwise by 90° with respect to the code rotation angle of the recognition code 730.

The rotation angle determiner 412 determines to rotate the UI 710 counterclockwise by 90° in order to match the code rotation angle of the recognition code 730 in FIG. 7B with the UI rotation angle of the UI 710 of the code recognition application. Depending on the determination of the rotation angle determiner 412, the UI controller 414 rotates the UI 710 in FIG. 7B counterclockwise by 90°. Accordingly, as illustrated in FIG. 7C, the icons 711, 712, 713 and 714 included in the code recognition application are displayed on the screen 190 in the form of being rotated counterclockwise by 90°.

Figure 8A:
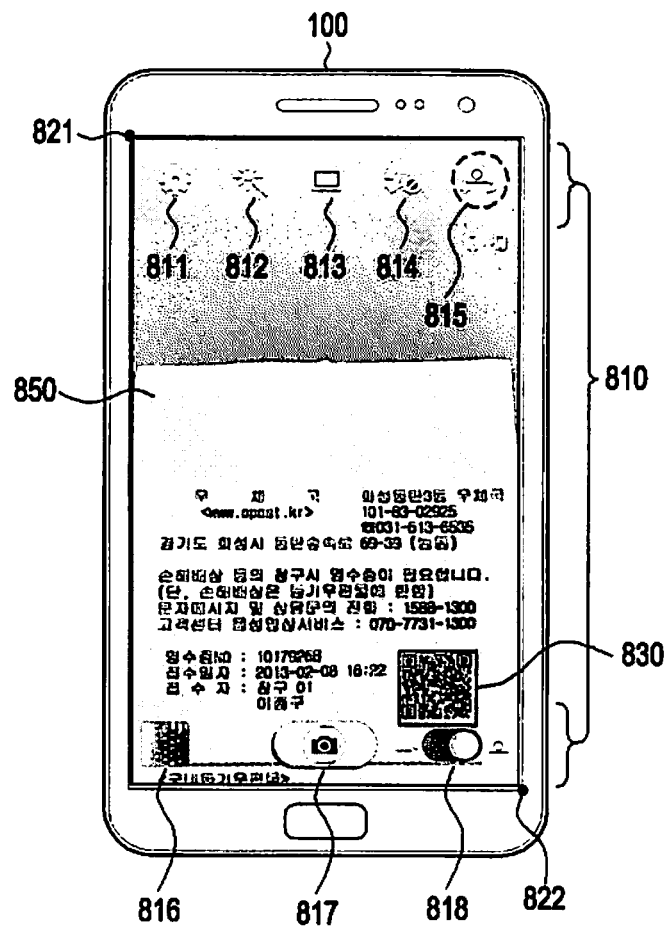
FIGS. 8A and 8B illustrate another example of rotating a UI direction of a code recognition application in accordance with a code recognition method by the mobile terminal shown in FIG. 1.
Figure 8B:
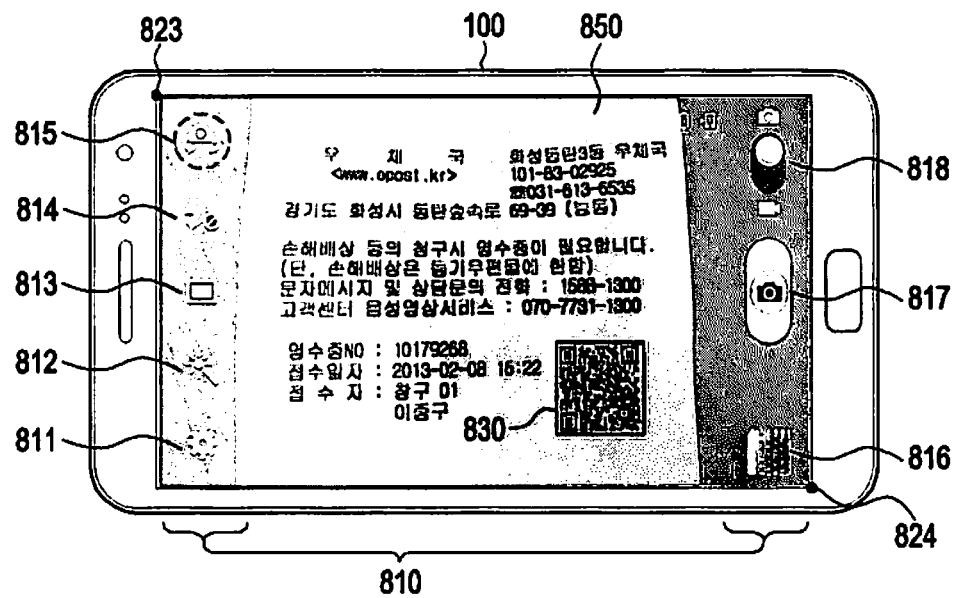

FIGS. 8A and 8B illustrate another example of rotating a UI direction of a code recognition application in accordance with a code recognition method by the mobile terminal shown in FIG. 1.

Referring to FIGS. 8A and 8B, on the screen 190, a UI 810 of a code recognition application is displayed including icons 811, 812, 813, 814, 815, 816, 817 and 818 corresponding to the functions of detecting a recognition code or a text. In addition, on the screen 190, an image 850 that is being entered through the camera module 150 is displayed. The image 850 includes a recognition code 830. In both of FIGS. 8A and 8B, a code rotation angle of the recognition code 830 and a UI rotation angle of the UI 810 of the code recognition application are 0° (corresponding to the normal direction).

Referring to FIG. 8A, by selecting a Camera icon 815, the user receives the image 850 through the camera module 150. If the mobile terminal 100 keeps the portrait form as shown in FIG. 8A, the code recognizer 402 in the controller 110 detects the recognition code 830 included in the image 850 by scanning from a first point 821 to a second point 822. In accordance with an embodiment of the present invention, the camera module 150 scans the image 850 from the first point 821 to the second point 822, and delivers the results to the code recognizer 402.

In FIG. 8B, by selecting the Camera icon 815, the user receives the image 850 through the camera module 150. If the mobile terminal 100 keeps the landscape form as shown in FIG. 8B, the code recognizer 402 in the controller 110 detects the recognition code 830 included in the image 850 by scanning from a third point 823 to a fourth point 824. In accordance with an embodiment of the present invention, the camera module 150 scans the image 850 from the third point 823 to the fourth point 824, and delivers the results to the code recognizer 402.

FIGS. 9A to 9C illustrate yet another example of rotating a UI direction of a code recognition application in accordance with a code recognition method by the mobile terminal shown in FIG. 1.

Referring to FIGS. 9A to 9C, on the screen 190, a UI 910 of a code recognition application is displayed including icons 911, 912, 913, 914, 915, 916, 917 and 918 corresponding to the functions of detecting a recognition code or a text. In addition, on the screen 190, an image 950 that is being entered through the camera module 150 is displayed. The image 950 includes a recognition code 930. FIGS. 9A, 9B and 9C show, in a chronological order, the screen 190 of the mobile terminal 100 that has driven a code recognition application in the code recognition mode.

FIG. 9A shows the screen 190 when the user has executed the code recognition application in order to generate the recognition code 930 and a code image. FIG. 9B shows the screen 190 when the user has rotated the mobile terminal 100 in FIG. 9A counterclockwise by 90°. As illustrated in FIG. 9B, the code rotation angle of the recognition code 930 is different from the UI rotation angle of the UI 910 of the code recognition application. In FIG. 9B, the direction of the UI 910 is rotated counterclockwise by 90° with respect to the direction of the recognition code 930.

The rotation angle determiner 412 determines to rotate the UI 910 clockwise by 90° in order to match the code rotation angle of the recognition code 930 in FIG. 9B with the UI rotation angle of the UI 910 of the code recognition application. Depending on the determination of the rotation angle determiner 412, the UI controller 414 rotates the UI 910 in FIG. 9B clockwise by 90°. Accordingly, as illustrated in FIG. 9C, the icons 911, 912, 913, 914, 915, 916, 917 and 918 included in the code recognition application are displayed on the screen 190 in the form of being rotated clockwise by 90°.

In FIG. 9B, by entering a user input for selecting a Camera icon 915 to the screen 190, the user requests the mobile terminal 100 to rotate the UI 910 in order to match the UI rotation angle of the UI 910 with the code rotation angle of the recognition code 930. Upon receiving the user input for selecting the Camera icon 915 from the user, the controller 110 rotates the UI 910 of the code recognition application to the UI 910 as illustrated in FIG. 9C.

FIGS. 10A and 10B illustrate an example of detecting a recognition code and a text in accordance with a code recognition method by the mobile terminal shown in FIG. 1. FIGS. 10A and 10B illustrate the recognition code and the text detected by the mobile terminal 100 that is in the portrait form.

Referring to FIG. 10A, on the screen 190, a UI 1010 of a code recognition application is displayed including icons 1011, 1012, 1013, 1014, 1015, 1016, 1017 and 1018 corresponding to the functions of detecting a recognition code or a text. In addition, on the screen 190, an image 1050 that is being entered through the camera module 150 is displayed. The image 1050 includes a recognition code 1030. In FIG. 10A, a code rotation angle of the recognition code 1030 and a UI rotation angle of the UI 1010 of the code recognition application are both 0° or correspond to the normal direction.

The camera module 150 generates a code image by receiving the image 1050. The code recognizer 402 extracts the recognition code 1030 from the code image, and the text recognizer 404 extracts a text from the code image. FIG. 10B shows the screen 190 on which the recognition code 1030 and the text extracted from the image 1050 in FIG. 10A are displayed.

Referring to FIG. 10B, the same text as the text included in the image 1050 in FIG. 10A is displayed on the screen 190.

The recognition code 1030 is converted into content 1040 corresponding to the recognition code 1030 by the code recognizer 402. The screen 190 displays the content 1040 in place of the recognition code 1030, as a result of the recognition code detection. For example, the recognition code 1030 in FIG. 10A corresponds to the content 1040 representing a web page address. Thus, in FIG. 10B, a web page address is displayed in place of the recognition code 1030.

Figure 11A:
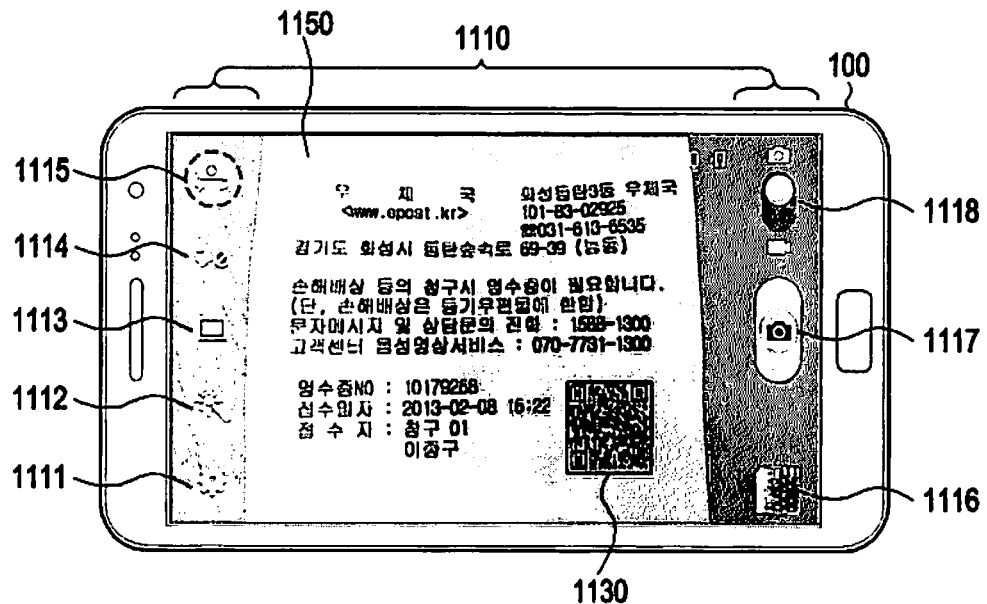
FIGS. 11A and 11B illustrate another example of detecting a recognition code and a text in accordance with a code recognition method by the mobile terminal shown in FIG. 1.
Figure 11B:
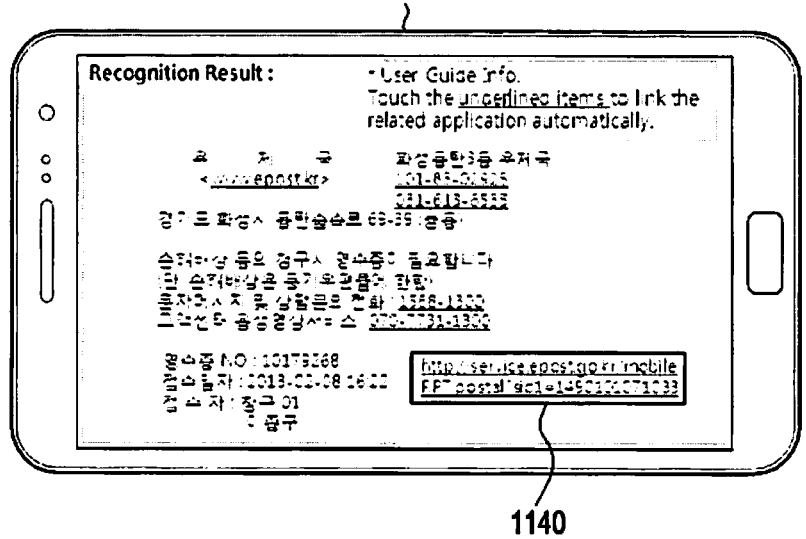

FIGS. 11A and 11B illustrate another example of detecting a recognition code and a text in accordance with a code recognition method by the mobile terminal shown in FIG. 1. FIGS. 11A and 11B illustrate the recognition code and the text detected by the mobile terminal 100 that is in the landscape form.

Referring to FIG. 11A, on the screen 190, a UI 1110 of a code recognition application is displayed including icons 1111, 1112, 1113, 1114, 1115, 1116, 1117 and 1118 corresponding to the functions of detecting a recognition code or a text. In addition, on the screen 190, an image 1150 that is being entered through the camera module 150 is displayed. The image 1150 includes a recognition code 1130. In FIG. 11A, a code rotation angle of the recognition code 1130 and a UI rotation angle of the UI 1110 of the code recognition application are both 0° or correspond to the normal direction.

The camera module 150 generates a code image by receiving the image 1150. The code recognizer 402 detects the recognition code 1130 from the code image, and the text recognizer 404 detects a text from the code image. FIG. 11B shows the screen 190 on which the recognition code 1130 and the text detected from the image 1150 in FIG. 11A are displayed.

Referring to FIG. 11B, the same text as the text included in the image 1150 in FIG. 11A is displayed on the screen 190. The recognition code 1130 is converted into content 1140 corresponding to the recognition code 1130 by the code recognizer 402. The screen 190 displays the content 1140 in place of the recognition code 1130, as a result of the recognition code detection. For example, the recognition code 1130 in FIG. 11A corresponds to the content 1140 representing a web page address. Thus, in FIG. 11B, a web page address is displayed in place of the recognition code 1130.

Figure 12:
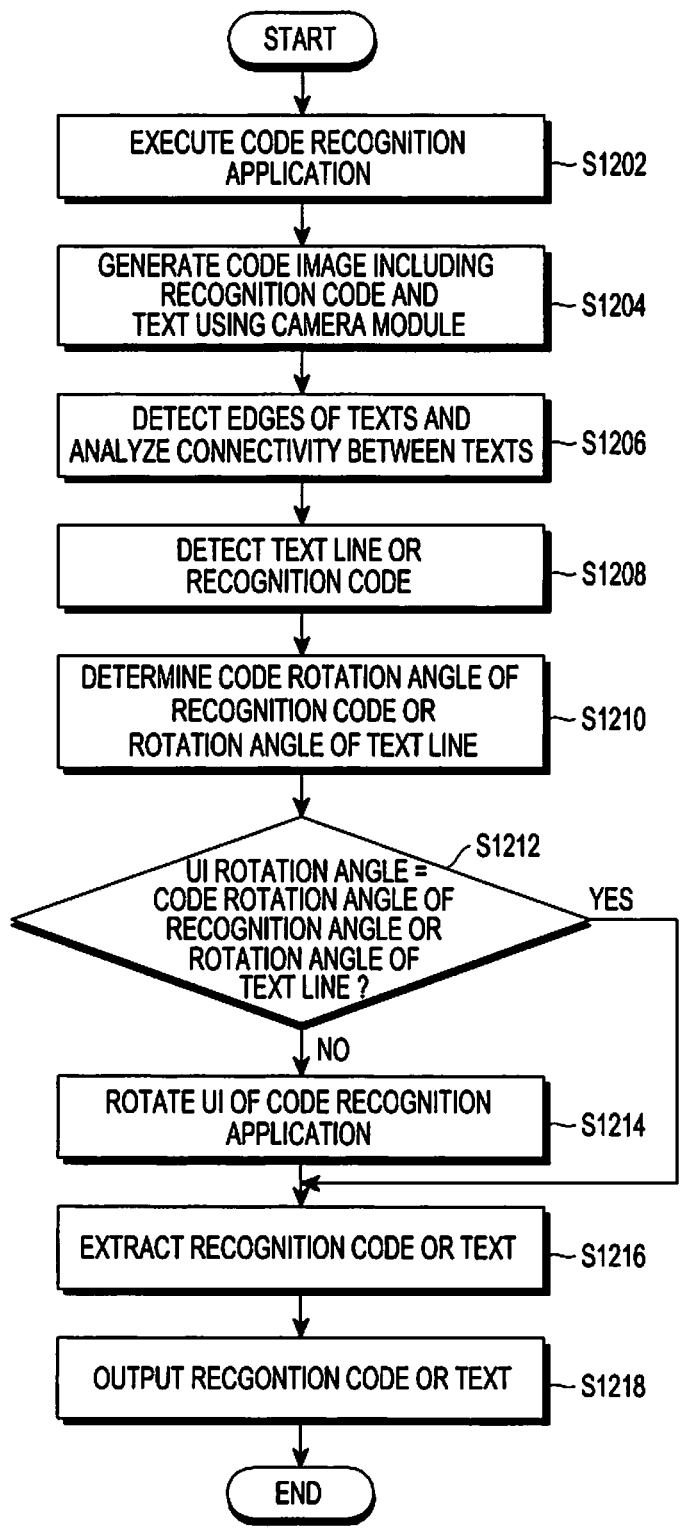
FIG. 12 is a flowchart illustrating another example of a code recognition method by the mobile terminal shown in FIG. 1.

FIG. 12 is a flowchart illustrating another example of a code recognition method by the mobile terminal shown in FIG. 1.

Referring to FIG. 12, the controller 110 of the mobile terminal 100 executes a code recognition application in step S1202. In accordance with an embodiment of the present invention, step S1202 is performed when the I/O module 160 or the screen 190 receives a user input for entering the code recognition mode or a user input for executing a code recognition application, from the user. If the code recognition application is executed, the camera module 150 that interworks with the code recognition application performs a photographing operation. The camera module 150 receives an image in real time using a lens. If the code recognition application is executed, a UI of the code recognition application is displayed on the screen 190.

If the code recognition application is executed, the mobile terminal 100 generates a code image including a recognition code and a text using the camera module 150 in step S1204. The user moves the first camera 151 or the second camera 152 of the camera module 150 by moving the mobile terminal 100. The user moves the mobile terminal 100 so that an image including a recognition code is entered to the first camera 151 or the second camera 152, and then, enters a user input for photographing or scanning to the mobile terminal 100. In accordance with an embodiment of the present invention, if the mobile terminal 100 enters the code recognition mode, the camera module 150 converts the image that is received in real time through the first camera 151 or the second camera 152, into a code image, even though a user input for photographing or scanning is not received from the user.

If the code image is generated by the camera module 150, the text recognizer 404 detects edges of texts included in the code image and analyzes the connectivity between the texts in step S1206.

Generally, texts have the form of word or sentence, and are listed consecutively in regular intervals. In particular, a gap between texts (e.g., characters) on the same line is very short, compared with that between different images or blanks. Therefore, the texts on the same line are looked as if they are connected to each other. The characteristics that the texts are connected are referred to as connectivity between texts. The text recognizer 404 determines the presence/absence of texts in the code image by analyzing the connectivity between texts, or detects the texts located on the same line. In accordance with an embodiment of the present invention, the texts listed adjacent to each other on the same line is referred to as a text line. As illustrated in FIGS. 13A to 13C, texts on text lines 1321, 1322, 1323 and 1324 have the same rotation angle as that of a recognition code 1330. Accordingly, in accordance with an embodiment of the present invention, the controller 110 adjusts a UI rotation angle of the code recognition application using the rotation angle of the recognition code 1330 and the texts included in the text lines 1321, 1322, 1323 and 1324.

In step S1208, the code recognizer 402 detects a recognition code, or the text recognizer 440 detects a text line. If a text line and a recognition code are detected from the code image, the rotation angle determiner 412 determines a code rotation angle of the recognition code or a rotation angle of the text line in step S1210.

The rotation angle determiner 412 determines in step S1212 whether a UI rotation angle of the code recognition application is equal to the code rotation angle of the recognition code or the rotation angle of text line. If it is determined in step S1212 that the UI rotation angle is not equal to the code rotation angle of the recognition code or the rotation angle of text line, the rotation angle determiner 412 determines to match the UI rotation angle of the code recognition application with the code rotation angle of the recognition code or the rotation angle of text line. Here, the rotation angle of the text line is assumed to be the same as the code rotation angle of the recognition code. Accordingly, in step S1214, the UI controller 414 rotates the UI of the code recognition application so that the UI rotation angle of the code recognition application is equal to the code rotation angle of the recognition code or the rotation angle of text line. For example, if the UI of the code recognition application is rotated counterclockwise by 90° with respect to the recognition code and the text line, the UI controller 414 rotates the UI of the code recognition application clockwise by 90° in step S1214.

In step S1216, the code recognizer 402 extract the recognition code or the text recognizer 404 in the controller 110 extracts a text included in the code image or the text line. If the recognition code or text is also extracted, the controller 110 controls the screen 190 to output the recognition code or text as extraction results in step S1218. In step S1218, the screen 190 may simply display the recognition code and the text in the form of image or text.

In accordance with another embodiment of the present invention, the controller 110 controls the mobile terminal 100 to perform an operation corresponding to the recognition code or text as the recognition code or text detection results.

For example, if the content included in the recognition code is about an Internet address, the controller 110 controls the mobile terminal 100 to display a web page corresponding to the Internet address on the screen 190.

If it is determined in step S1212 that the UI rotation angle is equal to the code rotation angle of the recognition code or rotation angle of the text line, the code recognizer 402 extract the recognition code or text recognizer 404 in the controller 110 extracts a text included in the code image or the text line in step S1216. If the recognition code or text is also extracted, the controller 110 controls the screen 190 to output the recognition code and text as extraction results in step S1218. In step S1218, the screen 190 may simply display the recognition code and the text in the form of image or text.

In accordance with another embodiment of the present invention, the controller 110 controls the mobile terminal 100 to perform an operation corresponding to the recognition code or the text. For example, if the content included in the recognition code is about an Internet address, the controller 110 controls the mobile terminal 100 to display a web page corresponding to the Internet address on the screen 190.

FIGS. 13A to 13C illustrate yet another example of detecting a recognition code and a text in accordance with a code recognition method by the mobile terminal shown in FIG. 1. FIGS. 13A, 13B and 13C show, in a chronological order, the screen 190 of the mobile terminal 100 that has driven a code recognition application in the code recognition mode.

Referring to FIGS. 13A to 13C, on the screen 190, a UI 1310 of a code recognition application is displayed including icons 1311, 1312, 1313, 1314, 1315, 1316, 1317 and 1318 corresponding to the functions of detecting a recognition code or a text. In addition, on the screen 190, an image 1350 that is being entered through the camera module 150 is displayed. The image 1350 includes a recognition code 1330. In FIG. 13A, a code rotation angle of the recognition code 1330 and a UI rotation angle of the UI 1310 of the code recognition application are both 0° or correspond to the normal direction.

The camera module 150 generates a code image by receiving the image 1350. The text recognizer 404 detects text lines 1321, 1322, 1323 and 1324 from the code image. FIG. 13B shows the screen 190 on which the text lines 1321, 1322, 1323 and 1324 detected from the image 1350 in FIG. 13A are displayed.

Referring to FIG. 13B, the same text as the text included in the image 1350 in FIG. 13A is displayed on the screen 190. In addition, a text area 1320 including the text lines 1321, 1322, 1323 and 1324 is shown in the landscape form, same as the form of the mobile terminal 100. The rotation angle of the texts is equal to the code rotation angle of the recognition code 1330. In FIG. 13B, the code rotation angle of the recognition code 1330 is 0° or corresponds to the normal direction. Therefore, the rotation angle of the texts included in the image 1350 is also 0° or corresponds to the normal direction.

The rotation angle determiner 412 compares the UI rotation angle of the UI 1310 of the code recognition application with the rotation angle of the text lines 1321, 1322, 1323 and 1324. As illustrated in FIG. 13B, the UI rotation angle of the UI 1310 is different from the rotation angle of the text lines 1321, 1322, 1323 and 1324. Therefore, the rotation angle determiner 412 determines to rotate the UI 1310 of the code recognition application clockwise by 90°.

Depending on the determination of the rotation angle determiner 412, the UI controller 414 rotates the UI 1310 in FIG. 13B clockwise by 90°. Accordingly, as illustrated in FIG. 13C, the icons 1311, 1312, 1313, 1314, 1315, 1316, 1317 and 1318 included in the code recognition application as shown in FIG. 13B are displayed on the screen 190 by being rotated clockwise by 90°.

It can be appreciated that the code recognition method by the mobile terminal according to an embodiment of the present invention may be implemented in the form of hardware, software or a combination thereof. The software may be stored in a volatile or non-volatile storage (e.g., an erasable/re-writable ROM), a memory (e.g., a RAM, a memory chip, a memory device or memory IC), or an optically or magnetically recordable machine (e.g., computer)-readable storage medium (e.g., Compact Disk (CD), Digital Versatile Disk (DVD), magnetic disk, or magnetic tape). The code recognition method according to an embodiment of the present invention may be implemented by a computer or a mobile terminal that includes a controller and a memory. It will be apparent to those of ordinary skilled in the art that the memory is an example of the machine-readable storage medium suitable to store a program or programs including instructions for implementing embodiments of the present invention. Therefore, the present invention may include a program including codes for implementing the apparatus and method defined by the appended claims, and a machine (e.g., computer)-readable storage medium storing the program. The program may be electronically carried by any media such as communication signals which are transmitted through wired/wireless communications.

The mobile terminal may receive and store the program from a program server, to which the mobile terminal is connected by wires or wirelessly. The program server may include a memory for storing a program including instructions for performing the code recognition method by the mobile terminal and for storing information needed for the code recognition method, a communication unit for performing wired/wireless communication with the mobile terminal, and a controller for transmitting the program to the mobile terminal automatically or at the request of the mobile terminal.

As is apparent from the foregoing description, an aspect of the present invention may provide a mobile terminal for adjusting a UI rotation angle of a code recognition application depending on the direction of a recognition code or text entered through a camera, to recognize the recognition code and text quickly and efficiently, and a code recognition method thereof.

While the present invention has been shown and described with reference to certain embodiments thereof, it will be understood by those skilled in the art that various changes in form and details may be made therein without departing from the spirit and scope of the present invention as defined by the appended claims and their equivalents.

What is claimed is:

1. A method for recognizing a recognition code in a mobile terminal, the method comprising:
   detecting at least a portion of a recognition code from an image including the recognition code using a code recognition application;
   determining a code rotation angle of the recognition code;
   determining whether a User Interface (UI) rotation angle of the code recognition application is equal to the code rotation angle of the recognition code;
   if the UI rotation angle is not equal to the code rotation angle, rotating a UI of the code recognition application so that the UI rotation angle of the code recognition application is equal to the code rotation angle; and extracting the recognition code or a text from the image based on the code rotation angle of the recognition code.

2. The method of claim 1, before detecting the at least a portion of the recognition code from the image including the recognition code, further comprising:
receiving a user input for requesting to perform a code recognition mode for detecting the recognition code; and
executing the code recognition application for detecting the recognition code.

3. The method of claim 1, wherein extracting the recognition code or the text comprises:
determining a scan direction of the image based on the code rotation angle of the recognition code;
extracting the text by scanning the image in the scan direction; and
outputting the recognition code or the text.

4. The method of claim 1, after detecting the at least a portion of the recognition code from the image including the recognition code, further comprising:
detecting a text line including the text from the image including the recognition code;
determining a rotation angle of the text line; and
extracting the recognition code or the text based on the rotation angle of the text line.

5. The method of claim 4, after determining the rotation angle of the text line, further comprising:
determining whether a UI rotation angle of the code recognition application is equal to the rotation angle of the text line; and
rotating, if the UI rotation angle is not equal to the rotation angle of the text line, a UI of the code recognition application so that the UI rotation angle is equal to the rotation angle of the text line.

6. An electronic device for recognizing a recognition code, the electronic device comprising:
a camera configured to receive an image including the recognition code; and
a processor configured to:
detect at least a portion of the recognition code from the image including the recognition code using a code recognition application,
determine whether a User interface (UI) rotation angle of the code recognition application is coincident with a code rotation angle of the recognition code,
if the UI rotation angle is not coincident with the code rotation angle, rotate a UI of the code recognition application so that the UI rotation angle of the code recognition application is coincident with the code rotation angle, and
extract the recognition code or a text from the image including the recognition code based on the code rotation angle of the recognition code.

7. The electronic device of claim 6, further comprising:
an input/output device configured to receive a user input for requesting to perform a code recognition mode for detecting the recognition code.

8. The electronic device of claim 7, wherein the processor executes the code recognition application for detecting the recognition code in response to the user input.

9. The electronic device of claim 6, wherein the processor determines a scan direction of the image based on the code rotation angle of the recognition code, and extracts the text by scanning the image in the scan direction.

10. The electronic device of claim 6, wherein the processor detects a text line including the text from the image including the recognition code, determines a rotation angle of the text line, and extracts the recognition code or the text based on the rotation angle of the text line.

11. The electronic device of claim 10, wherein the processor determines whether a UI rotation angle of the code recognition application is equal to the rotation angle of the text line, and rotates, if the UI rotation angle is not equal to the rotation angle of the text line, a UI of the code recognition application so that the UI rotation angle is equal to the rotation angle of the text line.

* * * * *